US006861021B2

(12) United States Patent
Montgomery et al.

(10) Patent No.: US 6,861,021 B2
(45) Date of Patent: Mar. 1, 2005

(54) MOLDING TOOL CONSTRUCTION AND MOLDING METHOD

(75) Inventors: Iain Montgomery, Bergen op Zoom (NL); Peter James Zuber, Pittsfield, MA (US)

(73) Assignee: General Electric Company, Pittsfield, MA (US)

( * ) Notice: Subject to any disclaimer, the term of this patent is extended or adjusted under 35 U.S.C. 154(b) by 170 days.

(21) Appl. No.: 10/366,035

(22) Filed: Feb. 13, 2003

(65) Prior Publication Data

US 2003/0193105 A1 Oct. 16, 2003

Related U.S. Application Data

(60) Provisional application No. 60/372,897, filed on Apr. 16, 2002.

(51) Int. Cl.⁷ ............................................... B29C 33/02
(52) U.S. Cl. ..................... 264/69; 249/111; 249/116; 249/134; 264/219; 264/327; 425/407; 425/548
(58) Field of Search ................. 264/69, 328.2, 264/328.18, 334, 219, 328.16, 519, 521, 327, 40.6; 425/547, 144, 548, 552, 526, 407; 249/135, 111, 134, 114.1–116

(56) References Cited

U.S. PATENT DOCUMENTS

| | | | | |
|---|---|---|---|---|
| 4,496,131 A | * | 1/1985 | Yang | 264/328.16 |
| 4,563,145 A | * | 1/1986 | de Meij | 425/407 |
| 5,160,466 A | | 11/1992 | Allan et al. | |
| 5,176,839 A | * | 1/1993 | Kim | 249/114.1 |
| 5,468,141 A | * | 11/1995 | Iwami et al. | 249/114.1 |
| 5,851,474 A | | 12/1998 | Allan et al. | |
| 6,276,656 B1 | * | 8/2001 | Baresich | 249/134 |
| 6,781,100 B2 | * | 8/2004 | Pilavdzic et al. | 219/601 |
| 6,787,071 B2 | * | 9/2004 | Gorczyca et al. | 264/219 |
| 2001/0003336 A1 | | 6/2001 | Abbott et al. | |
| 2002/0096512 A1 | | 7/2002 | Abbott et al. | |
| 2003/0121906 A1 | | 7/2003 | Abbott et al. | |

FOREIGN PATENT DOCUMENTS

| | | |
|---|---|---|
| JP | 09-314611 | 12/1997 |
| JP | 09-314628 | 12/1997 |
| JP | 1997314611 A | 12/1997 |
| JP | 1997314628 A | 12/1997 |
| JP | 10-100157 | 4/1998 |
| JP | 10-100216 | 4/1998 |
| JP | 1998100157 A | 4/1998 |
| JP | 1998100216 A | 4/1998 |
| WO | WO9851127 A1 | 11/1998 |
| WO | WO0029635 A2 | 5/2000 |
| WO | WO02059936 A2 | 8/2002 |
| WO | WO02059936 A3 | 8/2002 |

OTHER PUBLICATIONS

U.S. patent application Pub. No. 2001/0003336 A1 Abbott et al. –Jun. 14, 2001.

* cited by examiner

*Primary Examiner*—Jill L. Heitbrink

(57) ABSTRACT

An molding apparatus useful for molding polymer compositions includes a substrate; a first insulating layer having an electrical resistivity of at least about $10^{10}$ ohm-centimeters and thermal conductivity of about 0.2 to about 5 watts/(meter-kelvin); a heating element; a second insulating layer having an electrical resistivity of at least about $10^{10}$ ohm-centimeters and a thermal conductivity of at least about 5 watts/(meter-kelvin); and a first molding layer having a specific heat capacity of about 100 to about 2,500 joules/(kilogram-kelvin), and optionally, a second molding layer. The apparatus provides rapid heating and cooling of the mold surface. The apparatus may be employed for rapidly molding articles having desirable surface characteristics.

40 Claims, 1 Drawing Sheet

MOLDING TOOL CONSTRUCTION AND MOLDING METHOD

CROSS-REFERENCE TO RELATED APPLICATIONS

This application claims the benefit of the filing date of U.S. Provisional Application Ser. No. 60/372,897 filed Apr. 16, 2002; the entire contents of which are hereby incorporated by reference.

BACKGROUND

Molding of plastic parts is a process by which a plastic composition is formed into the geometry of the final part. Typically, the plastic is first heated beyond its melting point into its molten form. The molten plastic is then injected under high pressure into a mold cavity that has the geometric features of the final part. In order for the molten plastic to solidify, the mold may be cooled using a fluid such as water. The walls of the mold conduct heat from the molten plastic to water channels that carry the heat out of the tool.

Known molding processes are limited by the need for mold walls to be cold. The temperature of the mold is usually maintained at a level suggested by the manufacturer for the plastic. A colder mold provides faster solidification and quicker cycle times, resulting in lower cost parts. Warmer molds, however, allow the material to flow farther with less pressure, making the manufacturing process easier. In addition, the surface appearance of the part may be improved if the mold temperature is raised. Plastic compositions including with fillers, such as flake or fibrous fillers, are particularly difficult to mold into articles having a desirable surface appearance.

Some attempts have been made to overcome these problems using active heating of the mold surface. For example, U.S. Pat. No. 5,851,474 to Allan et al. generally describes an injection molding process in which inner surface areas of the mold are heated above the heat distortion temperature of the molded plastic. However, this method does not provide rapid molding cycles.

Other methods of mold temperature control are described in, for example, Japanese Patent Publication Nos. 09-314611, 09-314628, 10-100157, and 10-100216.

There is a need for an improved method and apparatus that provides rapid cycling between a higher temperature for filling the mold and a lower temperature for solidifying the article.

BRIEF SUMMARY

The above-described and other drawbacks are alleviated by a molding tool construction, comprising: a substrate; a first insulating layer having an electrical resistivity of at least about $10^{10}$ ohm-centimeters and thermal conductivity of about 0.2 to about 5 watts/(meter-kelvin); a heating element; a second insulating layer having an electrical resistivity of at least about $10^{10}$ ohm-centimeters and a thermal conductivity of at least about 5 watts/(meter-kelvin); and a first molding layer having a specific heat capacity of about 100 to about 2,500 joule/(kilogram-kelvin); wherein the first insulating layer is interposed between the substrate and the heating element, and the second insulating layer is interposed between the heating element and the first molding layer and optionally a second molding layer Other embodiments, including a molding method, are described in detail below.

DETAILED DESCRIPTION OF THE PREFERRED EMBODIMENTS

Figure 1:
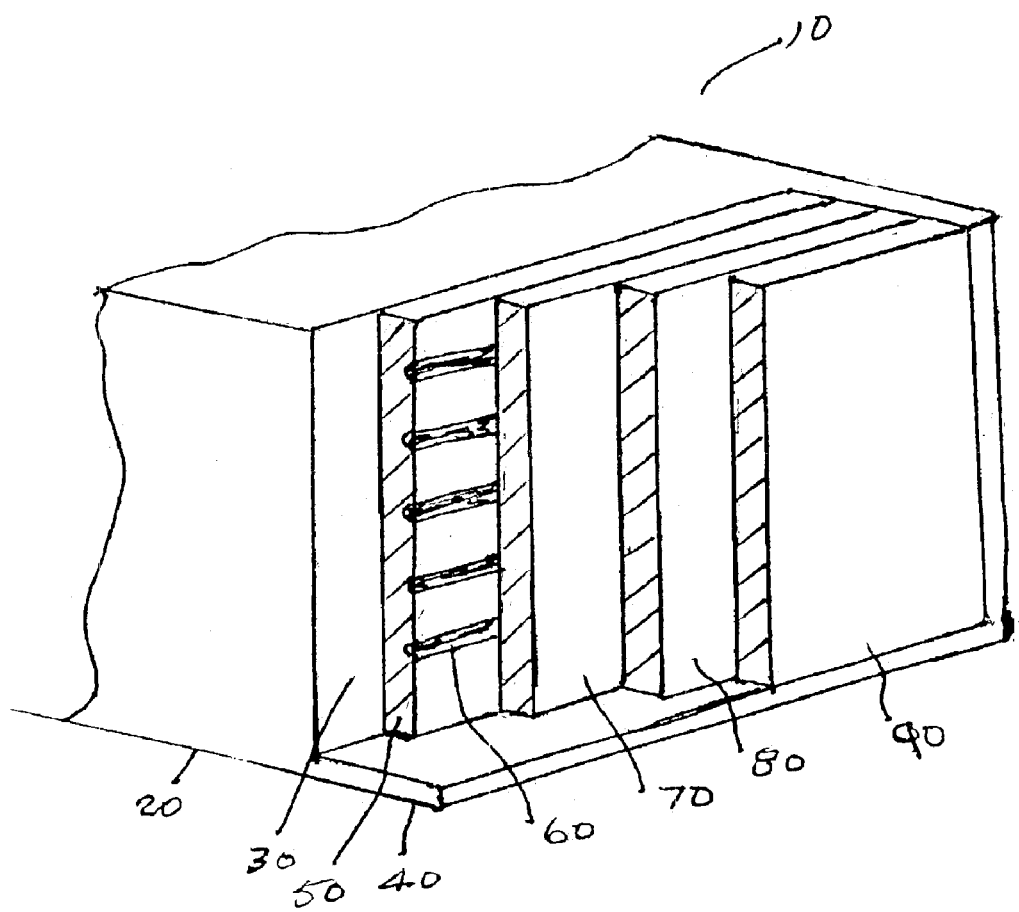
FIG. 1 is a cutaway depiction of a molding apparatus comprising a substrate, a first insulating layer, a heating element, a second insulating layer, a first molding layer, and, optionally, a second molding layer.

One embodiment is a molding tool construction, comprising: a substrate; a first insulating layer having an electrical resistivity of at least about $10^{10}$ ohm-centimeters and thermal conductivity of about 0.2 to about 5 watts/(meter-kelvin); a heating element; a second insulating layer having an electrical resistivity of at least about $10^{10}$ ohm-centimeters and a thermal conductivity of at least about 5 watts/(meter-kelvin); and a first molding layer having a specific heat capacity of about 100 to about 2,500 joule/(kilogram-kelvin); wherein the first insulating layer is interposed between the substrate and the heating element, and the second insulating layer is interposed between the heating element and the first molding layer, and, optionally, a second molding layer, which, if present, the first molding layer is interdisposed between the second insulating layer and the second molding layer.

The present inventors have found that in known apparatus providing active heating and cooling of a mold surface, one limitation on molding cycle time is that relatively large thermal masses are alternately heated and cooled. The apparatus described here allows for temperature cycling to occur in a relatively thin portion of the mold, thus reducing the thermal mass of the mold portion experiencing the full temperature fluctuations of the mold surface. This reduction in thermal mass, as well as the properties of the mold features described herein, allow for rapid temperature cycling and thus shorter molding cycles.

The molding apparatus comprises a substrate. In a preferred embodiment, the substrate comprises a first surface and a wall substantially perpendicular to and extending from the first surface. The first surface and the wall define a recess into which the first insulating layer, the heating element, the second insulating layer, the first molding layer, and the second molding layer may be disposed. Disposition of these features within the recess protects them from damage when the opposing portions of the mold are moved in and out of contact with each other. Disposition of these features within the recess also protects them from delamination that might initiate at an exposed edge of the mold.

In one embodiment, the substrate comprises a channel for circulation of cooling fluid. A plurality of cooling channels may be used.

The substrate preferably has a coefficient of thermal expansion of about 4 to about 15 micrometer/(meter-° C.) at 20° C. Within this range, the coefficient of thermal expansion may more preferably be at least about 8 micrometer/(meter-° C.), still more preferably at least about 11 micrometer/(meter-° C.). Also within this range, the coefficient of thermal expansion may more preferably be up to about 14 micrometer/(meter-° C.), still more preferably up to about 13 micrometer/meter-° C.). The coefficient of thermal expansion is often isotropic, but it may preferably be measured in a direction normal to the plane of the first surface of the substrate (e.g., normal to the plane of the first insulating layer).

There is no particular limitation on the material used to construct the substrate. Suitable materials include metals selected from the group consisting of chromium, manganese, iron, cobalt, nickel, copper, molybdenum, alloys comprising at least one of the foregoing metals, and combinations comprising at least one of the foregoing metals.

Presently preferred materials comprise stainless steels such as, for example, P20 steel, H13 steel, 420 stainless steel, aluminum, and the like, and combinations comprising at least one of the foregoing materials.

Methods of preparing the substrate are known in the art.

The molding apparatus comprises a first insulating layer. The first insulating layer serves to electrically insulate the heating element from the substrate. The first insulating layer has an electrical resistivity of at least about $10^{10}$ ohm-centimeters measured at 20° C., preferably at least about $10^{12}$ ohm-centimeters, more preferably at least about $10^{14}$ ohm-centimeters. The electrical resistivity is measured according to ASTM D1829 in the direction normal to the plane of the layer (i.e., across the thickness of the layer).

The first insulating layer further serves to regulate heat flow between the heating element and the substrate so that that heat flow is sufficient to allow efficient cooling of the mold surface during cooling cycles, but not so great as to allow excessive heating of the substrate during heating cycles. The thermal conductivity of the first insulating layer is about 0.2 to about 5 watts/(meter-kelvin). Within this range, the thermal conductivity may preferably be up to about 2 watts/(meter-kelvin), more preferably up to about 1 watt/(meter-kelvin). The thermal conductivity is often isotropic, but it may preferably be measured in a direction normal to the plane of the first insulating layer (i.e., through the thickness of the first insulating layer).

The thickness of the first insulating layer will depend on its composition and method of fabrication. In one embodiment, the first insulating layer has a thickness of about 0.05 to about 1 millimeter. Within this range, the thickness may preferably be at least about 0.1 millimeter, more preferably at least about 0.2 millimeter. Also within this range, the thickness may preferably be up to about 0.75 millimeter, more preferably up to about 0.5 millimeter.

In one embodiment, the first insulating layer has a coefficient of thermal expansion of about 4 to about 15 micrometer/(meter-° C.) at 20° C. Within this range, the coefficient of thermal expansion may preferably be at least about 6 micrometer/(meter-° C.), more preferably at least about 11 micrometer/(meter-° C.). Also within this range, the coefficient of thermal expansion may preferably be up to about 13 micrometer/(meter-° C.). The coefficient of thermal expansion is often isotropic, but it may preferably be measured in a direction normal to the plane of the first insulating layer (i.e., through the thickness of the first insulating layer).

There is no particular limitation on the composition of the first insulating layer. Suitable materials for the first insulating layer include, for example, zirconia, alumina, yttria, yttria-modified zirconia, and the like, and combinations comprising at least one of the foregoing materials. A presently preferred first insulating layer may comprise at least about 50 weight percent, preferably at least about 70 weight percent, more preferably at least about 90 weight percent, zirconia.

There is no particular limitation on the method used to fabricate the first insulating layer. In a preferred embodiment, one or more of the first insulating layer, the heating element, the second insulating layer, and the first molding layer are applied by thermal-spray techniques known in the art. Such techniques are described in, for example, U.S. Patent Application Publication No. 2001/0003336 A1 to Abbott et al.

The molding apparatus comprises a heating element. A plurality of heating elements may be used. The heating element, when connected to a voltage source, provides resistive heating to heat the molding surface to a temperature above the melting point, and/or heat distortion temperature, and/or glass transition temperature of the polymer composition. The resistance of the heating element may be selected according to the equation $R=V^2/P$, where R is the resistance of the heating element, V is the voltage across the heating element, and P is the desired power level.

In one embodiment, the heating element has a coefficient of thermal, expansion of about 2 to about 20 micrometer/(meter-° C.) at 20° C. Within this range, the coefficient of thermal expansion may preferably be at least about 6 micrometer/(meter-° C.), more preferably at least about 8 micrometer/(meter-° C.). Also within this range, the coefficient of thermal expansion may preferably be up to about 13 micrometer/(meter-° C.). The coefficient of thermal expansion is often isotropic, but it may preferably be measured in a direction normal to the plane of the first insulating layer (i.e., through the thickness of the first insulating layer).

The thickness of the heating element will depend on its composition and method of fabrication. In one embodiment, the heating element has a thickness of about 0.05 to about 1 millimeter. Within this range, the thickness may preferably be at least about 0.1 millimeter, more preferably at least about 0.2 millimeter. Also within this range, the thickness may preferably be up to about 0.75 millimeter, more preferably up to about 0.5 millimeter. As the heating element may be in the form, for example, of a wire, the thickness limitation above will be understood as the maximum thickness of the heating element in a direction normal to the first surface of the substrate. The heating element may be recessed in the first insulating layer, the second insulating layer, or both.

There is no particular limitation on the composition of the heating element. Suitable materials for fabrication of the heating element include silicon carbide, molybdenum disilicide, tungsten disilicide, lanthanum chromate, zirconium diboride, titanium, titania, titanium nitride, titanium diboride, tin oxide, copper, copper oxide, alloys of nickel and chromium and iron containing less than 30 weight percent iron, conductive carbon fibers, conductive carbon blacks, and the like, and combinations comprising at least one of the foregoing materials. A presently preferred heating element may comprise at least about 50 weight percent, preferably at least about 70 weight percent, more preferably at least about 90 weight percent, of a material selected from titanium, titania, titanium nitride, and combinations thereof.

There is no particular limitation on the method used to fabricate the heating element. In one embodiment, the heating element is a pre-formed wire that is positioned within the mold apparatus. In a preferred embodiment, the heating element is fabricated by thermal-spray techniques known in the art, such as those described in, for example, U.S. Patent Application Publication No. 2001/0003336 A1 to Abbott et al. When the heating element is fabricated by a thermal-spray technique, it may comprise a conductive material and an insulating material (as described above for the first insulating layer), and its resistivity may be controlled by varying the ratio of the conductive material to the insulating material.

The molding apparatus comprises a second insulating layer. The second insulating layer electrically insulates the heating element from the first molding layer. The second insulating layer has an electrical resistivity of at least about $10^{10}$ ohm-centimeters measured at 20° C., preferably at least about $10^{12}$ ohm-centimeters, more preferably at least about $10^{14}$ ohm centimeters. The electrical resistivity is measured according to ASTM D1829 in the direction normal to the plane of the layer (i.e., across the thickness of the layer).

The second insulating layer also regulates heat flow from the heating element to the first molding layer. The second insulating layer has a thermal conductivity of at least about 5 watts/(meter-kelvin), preferably at least about 20 watts/(meter-kelvin), more preferably at least about 40 watts/(meter-kelvin). The thermal conductivity is often isotropic, but it may preferably be measured in a direction normal to the plane of the first insulating layer (i.e., through the thickness of the first insulating layer).

In one embodiment, the second insulating layer has a thickness of about 0.1 to about 2 millimeters. Within this range, the thickness may preferably be at least about 0.15 millimeter, more preferably at least about 0.2 millimeter. Also within this range, the thickness may preferably be up to about 1 millimeter, more preferably up to about 0.4 millimeter.

In one embodiment; the second insulating layer has a coefficient of thermal expansion of about 4 to about 15 micrometer/(meter-° C.) at 20° C. Within this range, the coefficient of thermal expansion may preferably be at least about 6 micrometer/(meter-° C.), more preferably at least about 11 micrometer/(meter-° C.). Also within this range, the coefficient of thermal expansion may preferably-be up to about 13 micrometer/(meter-° C.). The coefficient of thermal expansion is often isotropic, but it may preferably be measured in a direction normal to the plane of the second insulating layer (i.e., through the thickness of the second insulating layer).

In one embodiment, the ratio of the thermal conductivity of the second insulating layer to the thermal conductivity of the first insulating layer is at least about 2, preferably at least about 5, more preferably at least about 10. By using such a ratio, heat produced by the heating element is preferentially conducted toward the first molding layer rather than the substrate.

When the second insulating layer is applied by thermal-spray, it is important that the density of the second insulating layer is not so high that it "blows through" previously coated layers when applied. In one embodiment, the second insulating layer has a density of about 1,000 to about 10,000 kilograms per cubic meter. Within this range, the density may preferably be at least about 2,000 kilograms per cubic meter, more preferably at least about 3,000 kilograms per cubic meter. Also within this range, the density may preferably be up to about 6,000 kilograms per cubic meter, more preferably up to about 5,000 kilograms per cubic meter.

There is no particular limitation on the composition of the second insulating layer. Suitable materials for fabrication of the second insulating layer include, for example, alumina, aluminum nitride, mullite, zirconia, and the like, and combinations comprising at least one of the foregoing materials. A presently preferred second insulating layer may comprise at least about 50 weight percent, preferably at least about 70 weight percent, more preferably at least about 90 weight percent, alumina.

There is no particular limitation on the method used to fabricate the second insulating layer. In a preferred embodiment, the second insulating layer may be applied by thermal-spray techniques known in the art, such as those described in, for example, U.S. Patent Application Publication No. 2001/0003336 A1 to Abbott et al.

The molding apparatus comprises a first molding layer. The first molding layer may itself be molded and/or machined to provide the detailed shape of the molded article. The first molding layer further functions as a heat reservoir during heating cycles of the molding method. The first molding method has a specific heat capacity of about 100 to about 2,500 joule/(kilogram-kelvin).

In one embodiment, the first molding layer has a Rockwell hardness of at least about 10, preferably at least about 30, more preferably at least about 40.

In one embodiment, the first molding layer has an electrical conductivity sufficient to support electroplating of the second molding layer onto the first molding layer. This conductivity may correspond, for example, to an electrical resistivity at 20° C. of up to about $_{10^4}$ ohm-centimeter measured according to ASTM D1829.

The thickness of the first molding layer will depend on its composition and method of fabrication. In one embodiment, the first molding layer has a thickness of about 0.1 to about 4 millimeters. Within this range, the thickness may preferably be at least about 0.2 millimeter, more preferably at least about 0.5 millimeter. Also within this range, the thickness may preferably be up to about 3 millimeters, more preferably up to about 2 millimeters.

In one embodiment, the first molding layer has a coefficient of thermal expansion of about 4 to about 13 micrometers/(meter-° C.) at 20° C. Within this range, the coefficient of thermal expansion may preferably be at least about 8 micrometers/(meter-° C.), more preferably at least about 11 micrometers/(meter-° C.). The coefficient of thermal expansion is often isotropic, but it may preferably be measured in a direction normal to the plane of the first molding layer (i.e., through the thickness of the first molding layer).

The first molding layer is preferably machinable to form the precise contours of a molded article.

There is no particular limitation on the composition of the first molding layer. Suitable materials for fabrication of the first molding layer include, for example, tungsten, titanium, molybdenum, and the like, and alloys comprising at least one of the foregoing metals, and combinations comprising at least one of the foregoing metals. A presently preferred first molding layer may comprise at least about 50 weight percent, preferably at least about 70 weight percent, more preferably at least about 90 weight percent, tungsten., There is no particular limitation on the method used to fabricate the first molding layer. In a preferred embodiment, the first molding layer may be fabricated by a thermal-spray method such as those described in, for example, U.S. Patent Application Publication No. 2001/0003336 A1 to Abbott et al.

In one embodiment, the molding apparatus further comprises a second molding layer. In some instances, it may be desirable to have a first molding layer comprising a first material that facilitates construction (e.g., by machining)% of the molded article contours, and a second molding layer comprising a second material that is hard and polishable to a very smooth surface (e.g., a so-called Class A surface).

The second molding layer may have a Rockwell hardness of at least about 30, preferably at least about 40, more preferably at least about 50.

The thickness of the second molding layer, when present, will depend on its composition and method and fabrication. In one embodiment, the second molding layer has a thickness of about 0.01 to about 0.5 millimeter. Within-this range, the thickness may preferably be at least about 0.02 millimeter. Also within this range, the thickness may preferably be up to about 0.2 millimeter, more preferably up to about 0.1 millimeter.

The second molding layer is preferably highly smooth and lacking in pits and voids. In one embodiment, the second molding layer has a density of about 3,000 to about 15,000 kilograms per cubic meter. Within this range, the density may preferably be at least about 5,000 kilograms per cubic meter, more preferably at least about 7,000 kilograms per cubic meter. Also within this range, the density may preferably be up to about 13,000 kilograms per cubic meter, more preferably up to about 11,000 kilograms per cubic meter.

In one embodiment, the second molding layer has a coefficient of thermal expansion of about 4 to about 13 micrometers/(meter-° C.) at 20° C. Within this range, the coefficient of thermal expansion may preferably be at least about 8 micrometers/(meter-° C.), more preferably at least about 11 micrometers/(meter-° C.). The coefficient of thermal expansion is often isotropic, but it may preferably be measured in a direction normal to the plane of the second molding layer (i.e., through the thickness of the second molding layer).

There is no particular limitation on the material used to fabricate the second molding layer. Suitable materials include, for example, nickel, chromium, copper, alloys comprising at least one of the foregoing materials, and combinations comprising at least one of the foregoing materials. A presently preferred second molding layer may comprise at least about 50 weight percent, preferably at least about 70 weight percent, more preferably at least about 90 weight percent nickel.

There is no particular limitation on the method used to fabricate the second molding layer. In a preferred embodiment, the second molding layer may be electroplated onto the first molding layer using electroplating methods known in the art.

In order to improve durability and reduce delamination, it may be preferred that contiguous features of the invention adhere to each other. For example, in an embodiment in which the substrate first layer and the first insulating layer-are in contact, their compositions and surface properties may be chosen so that they adhere to each other. Likewise, in an embodiment in which the second insulating layer and the first molding layer contact each other, the compositions and properties of these layers may be chosen to improve adhesion between them. It will be understood that additional layers may be interposed between the features described here, and that adhesion between contacting layers may be desirable.

In one embodiment, the molding tool construction comprises: a steel substrate; a first insulating layer comprising zirconia and having an electrical resistivity of at least about 10 ohm-centimeters and thermal conductivity of about 0.2 to about 2 watts/(meter-kelvin) wherein the first insulating layer is applied as a thermal-sprayed coating; a heating element applied as a thermal-sprayed coating; a second insulating layer comprising alumina and having an electrical resistivity of at least about $10^{12}$ ohm-centimeters and a thermal conductivity of at least about 20 watts/(meter-kelvin); wherein the second insulating layer is applied as a thermal-sprayed coating; a first molding layer comprising tungsten and having a specific heat capacity of about 100 to about 2,500 joule/kilogram-kelvin; and a second molding layer comprising nickel and having a Rockwell hardness of at least about 40; wherein the first insulating layer is interposed between the substrate and the heating element, the second insulating layer is interposed between the heating element and the first molding layer, and the first molding layer is interposed between the second insulating layer and the second molding layer.

In another embodiment, the molding tool construction, comprises: a steel substrate; a first insulating layer comprising zirconia, having a thickness of about 0.2 to about 0.5 millimeters, having an electrical resistivity of at least about $10^{14}$ ohm-centimeters, and having a thermal conductivity of about 0.2 to about 1 watt/(meter-kelvin); wherein the first insulating layer is applied as a thermal-sprayed coating; a heating element comprising titanium, titania, titanium nitride, or a combination thereof; wherein the heating element is applied as a thermal-sprayed coating; a second insulating layer comprising alumina, having an electrical resistivity of at least about $10^{14}$ ohm-centimeters, and having a thermal conductivity of at least about 40 watts/(kelvin-meter); wherein the second insulating layer is applied as a thermal-sprayed coating; a first molding layer comprising tungsten and having a specific heat capacity of about 100 to about 2,500 joule/kelvin; wherein the first molding layer is applied as a thermal-sprayed coating; and a second molding layer comprising nickel and having a Rockwell hardness of at least about 40; wherein the second, molding layer is applied by electroplating; wherein the first insulating layer is interposed between the substrate and the heating element, the second insulating layer is interposed between the heating element and the first molding layer, and the first molding layer is interposed between the second insulating layer and the second molding layer.

FIG. 1 is a cutaway depiction of one embodiment of the mold 10. The substrate 20 has a first surface 30 and a wall 40. One face of the first insulating layer 50 is disposed on the first surface 30. The heating element 60 is recessed in the opposite face of the first insulating layer 50 and also contacts a face of the second insulating layer 70. One face of the first molding layer 80 is disposed on the opposite face of the second insulating layer 70. The optional second molding layer 90 is disposed on the opposite face of the first molding layer 80.

Another embodiment of the invention is polymer composition molding method, comprising: heating a molding surface of a molding apparatus; introducing a polymer composition into the molding apparatus; cooling the molding surface of the molding apparatus; and ejecting a molded article from the molding apparatus; wherein the molding apparatus comprises a substrate, a first insulating layer having an electrical resistivity of at least about $10^{10}$ ohm-centimeters and thermal conductivity of about 0.2 to about 5 watts/(meter-kelvin), a heating element, a second insulating layer having an electrical resistivity of at least about $10^{10}$ ohm-centimeters and a thermal conductivity of at least about 50 watts/(kelvin-meter), and a first molding layer having a specific heat capacity of about 10 to about 2,500 joules/(kilogram-kelvin), wherein the first insulating layer is interposed between the substrate and the heating element, and the second insulating layer is interposed between the heating element and the first molding layer.

There is no particular limitation on the polymer composition employed in the method. The polymer material may be, for example, an organic polymer material. The process may be applied to thermosettable polymer compositions, for example, those formed in situ by reactive injection molding (RIM) processes. It is preferred, however, that it is applied to thermoplastic polymer compositions. These may comprise, for example, thermoplastic polymer materials such as low density polyethylene (LDPE), certain polyesters including poly(butylene terephthalate), free radical-polymerized polystyrene (crystal and HI grades), polymers of (meth)acrylate esters and poly(ether-sulfones), high density polyethylene (HDPE), polypropylene, methylpentene copolymer (e.g., TPX® materials sold by Mitsui), nylon, certain aromatic polyesters, poly(ether ether ketone) (PEEK), poly(vinyl chloride) (PVC), poly(vinyl fluoride) (PVF) and poly(vinylidene fluoride) (PVdF), polyphenylene ether, polyphenylene sulfide, polyetherimide, polycarbonate, acrylonitrile-butadiene-styrene copolymer (ABS), polyorganosiloxane, epoxy thermoset resins, polyester thermoset resins, maleimide thermoset resins, and the like. The molding process is particularly suitable for application to polymer material, especially semicrystalline polymer material that can be effectively oriented; for example, a homopolyolefin or copolyolefin.

Blends and/or alloys comprising any of the above polymers may also be used.

The polymer composition may, optionally, further comprise a filler. The method is particularly useful for molding articles having an aesthetically desirable distribution of filler visible on their surface. Suitable fillers include, for example, glass fibers including coated glass fibers, glass flakes including coated glass flakes, glass beads, metal flakes, metal fibers, talc, mica, clay, coated aluminum sheet, and the like, and combinations comprising at least one of the foregoing fillers.

The polymer compositions may, optionally, further comprise pigments and/or dyes, including interference pigments.

The method may further comprise subjecting the polymer composition to vibrations effective to reorient the filler within the polymer composition. These so-called "melt manipulation" techniques are useful for minimizing flow lines, knit lines, and weld lines in molded articles. Such techniques are known in the art and described, for example in U.S. Pat. No. 5,160,466 to Allan et al. incorporated herein by reference.

The molding tool construction provides a multitude of benefits to the mold. The ability to heat and cool a mold during each molding cycle has been the object of interest in the molding industry for many years. There are several benefits to this approach. This technology, combined with a melt manipulation technology, can eliminate surface defects such as flow-lines in many thermoplastics. The surface of filled polymers, in general, will also be of higher quality since the added heat creates a "resin rich" surface free of the filler material. Thin walled plastic parts would also benefit in that the ability to fill a mold cavity is limited by the solidification of the plastic as it fills.

Parts that require surface features such as textures would also benefit because the plastic would be able to replicate the surface features more easily in its lower viscosity state. Thermoset materials molded with reaction injection molding (RIM) or liquid injection molding (LIM) techniques would benefit since these materials are heat cured to their solid state. Processes such as blow molding and thermoforming would see a significant increase in surface quality since the lower pressures of these processes does not produce parts with a quality surface appearance. The heat produced by this tool construction would aid in improving the surface quality in these molding methods. The tool construction would also benefit the rotational molding process, which is currently limited by its ability to heat and cool a large thermal mass during each molding cycle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A molding tool construction, comprising:

a substrate;

a first insulating layer having an electrical resistivity of at least about $10^{10}$ ohm-centimeters and thermal conductivity of about 0.2 to about 5 watts/(meter-kelvin);

a heating element;

a second insulating layer having an electrical resistivity of at least about $10^{10}$ ohm-centimeters and a thermal conductivity of at least about 5 watts/(meter/kelvin); and a first molding layer having a specific heat capacity of about 100 to about 2,500 joule/(kilogram-kelvin); and optionally, a second molding layer;

said first insulating layer is interposed between the substrate and the heating element, and said second insulating layer is interposed between the heating element and the first molding layer, and said first molding layer is interposed between the second insulating layer and the second molding layer, if present; and further wherein the first insulating layer comprises a material selected from the group consisting of alumina, yttria, yttria-modified zirconia, and combinations comprising at least one of the foregoing materials; the second insulting layer comprises a material selected from the group consisting of aluminum nitride, mullite, zirconia, and combinations comprising at least one of the foregoing materials; the first molding layer comprises a material selected from the group consisting of tungsten, titanium, molybdenum, alloys comprising at least one of the foregoing metals, and combinations comprising at least one of the foregoing materials; the second molding layer, if present, comprises a material selected from the group consisting of nickel, chromium, copper, alloys comprising at least one of the foregoing materials, and combinations comprising at least one of the foregoing materials.

2. The molding tool construction of claim 1, wherein the substrate comprises a first surface and a wall substantially perpendicular to and extending from the first surface, and wherein the first insulating layer, the heating element, the second insulating layer, and the first molding layer are disposed in a recess bounded by the first surface and the wall.

3. The molding tool construction of claim 1, wherein the substrate comprises a channel for circulation of cooling fluid.

4. The molding tool construction of claim 1, wherein the substrate has a coefficient of thermal expansion of about 4 to about 15 micrometer/(meter-° C.).

5. The molding tool construction of claim 1, wherein the substrate comprises a metal selected from the group consisting of chromium, manganese, iron, cobalt, nickel, copper, molybdenum, alloys comprising at least one of the foregoing metals, and combinations comprising at least one of the foregoing metals.

6. The molding tool construction of claim 1, wherein the substrate comprises P20 steel, H13 steel, 420 stainless steel, aluminum, or a combination thereof.

7. The molding tool construction of claim 1, wherein the first insulating layer has a thermal conductivity of about 0.2 to about 2 watts/(meter-kelvin).

8. The molding tool construction of claim 1, wherein the first insulating layer has a thickness of about 0.05 to about 1 millimeter.

9. The molding tool construction of claim 1, wherein the first insulating layer has a coefficient of thermal expansion of about 4 to about 15 micrometers/(meter-° C.).

10. The molding tool construction of claim 1, wherein the heating element has a coefficient of thermal expansion of about 2 to about 20 micrometers/(meter-° C.).

11. The molding tool construction of claim 1, wherein the heating element has a thickness of about 0.05 to about 1 millimeter.

12. The molding tool construction of claim 1, wherein the heating element comprises a material selected from the group consisting of silicon carbide, molybdenum disilicide, tungsten disilicide, lanthanum chromate, zirconium diboride, titanium, titania, titanium nitride, titanium diboride, tin oxide, copper, copper oxide, alloys of nickel and chromium and iron containing less than 30 weight percent iron, conductive carbon fibers, conductive carbon blacks, and combinations comprising at least one of the foregoing materials.

13. The molding tool construction of claim 1, wherein the heating element comprises titanium, titania, titanium nitride, or a combination comprising at least one of the foregoing materials.

14. The molding tool construction of claim 1, wherein the second insulating layer has a thermal conductivity of at least about 5 watts/(meter-kelvin).

15. The molding tool construction of claim 1, wherein the second insulating layer has a thickness of about 0.1 to about 2 millimeters.

16. The molding tool construction of claim 1, wherein the second insulating layer has a coefficient of thermal expansion of about 4 to about 15 micrometers/(meter-° C.).

17. The molding tool construction of claim 1, wherein the second insulating layer has a density of about 1,000 to about 10,000 kilograms per cubic meter.

18. The molding tool construction of claim 1, wherein the second insulating layer comprises zirconia.

19. The molding tool construction of claim 1, wherein the ratio of the thermal conductivity of the second insulating layer to the thermal conductivity of the first insulating layer is at least about 2.

20. The molding tool construction of claim 1, wherein the first molding layer has a specific heat capacity of about 100 to about 2,500 joules/(kilogram-kelvin).

21. The molding tool construction of claim 1, wherein the first molding layer has a Rockwell hardness of at least about 10.

22. The molding tool construction of claim 1, wherein the first molding layer has an electrical resistivity of up to about $10^{-4}$ ohm-centimeter.

23. The molding tool construction of claim 1, wherein the first molding layer has a thickness of about 0.1 to about 4 millimeters.

24. The molding tool construction of claim 1, wherein the first molding layer has a coefficient of thermal expansion of about 4 to about 13 micrometer/(meter-° C.).

25. The molding tool construction of claim 1, wherein the first molding layer comprises at least 90 weight percent of tungsten.

26. The molding tool construction of claim 1, further comprising a second molding layer having a Rockwell hardness of at least about 30.

27. The molding tool construction of claim 26, wherein the second molding layer has a Rockwell hardness of at least about 40.

28. The molding tool construction of claim 26, wherein the second molding layer has a thickness of about 0.01 to about 0.5 millimeters.

29. The molding tool construction of claim 26, wherein the second molding layer has a density of about 3,000 to about 15,000 kilograms per cubic meter.

30. The molding tool construction of claim 26, wherein the second molding layer has a coefficient of thermal expansion of about 4 to about 13 micrometer/(meter-° C.).

31. The molding tool construction of claim 26, wherein the second molding layer comprises at least 90 weight percent of nickel.

32. A molding tool construction comprising:
a steel substrate;
a first insulating layer having an electrical resistivity of at least about $10^{12}$ ohm-centimeters and thermal conductivity of about 0.2 to about 2 watts/(meter-kelvin) wherein the first insulating layer is applied as a thermal-sprayed coating;
a heating element applied as a thermal-sprayed coating;
a second insulating layer having an electrical resistivity of at least about $10^{12}$ ohm centimeters and a thermal conductivity of at least about 20 watts/(meter-kelvin); wherein the second insulating layer is applied as a thermal-sprayed coating;
a first molding layer comprising tungsten and having a specific heat capacity of about 100 to about 2,500 joule/kelvin; and
a second molding layer comprising nickel and having a Rockwell hardness of at least about 40;
wherein the first insulating layer is interposed between the substrate and the heating element, the second insulating layer is interposed between the heating element and the first molding layer, and the first molding layer is interposed between the second insulating layer and the second molding layer.

33. A molding tool construction, comprising:
a steel substrate;
a first insulating layer having a thickness of about 0.2 to about 0.5 millimeters, having an electrical resistivity of at least about $10^{14}$ ohm-centimeters, and having a thermal conductivity of about 0.2 to about 1 watts/(meter-kelvin); wherein the first insulating layer is applied as a thermal-sprayed coating;
a heating element comprising titanium, titania, titanium nitride, or a combination thereof; wherein the heating element is applied as a thermal-sprayed coating;
a second insulating layer having an electrical resistivity of at least about $10^{14}$ ohm-centimeters, and having a thermal conductivity of at least about 40 watts/(kelvin-meter);
wherein the second insulating layer is applied as a thermal-sprayed coating;
a first molding layer comprising tungsten and having a specific heat capacity of about 100 to about 2,500 joule/kelvin; wherein the first molding layer is applied as a thermal-sprayed coating; and
a second molding layer comprising nickel and having a Rockwell hardness of at least about 50; wherein the second molding layer is applied by electroplating;

wherein the first insulating layer is interposed between the substrate and the heating element, the second insulating layer is interposed between the heating element and the first molding layer, and the first molding layer is interposed between the second insulating layer and the second molding layer.

34. A process for molding a thermoplastic or thermosettable compositions comprising the steps of:

(1) heating a molding surface of a molding apparatus, (2) introducing a polymer composition into the molding apparatus, (3) cooling the molding surface of the molding apparatus, and (4) ejecting a molded article from the molding apparatus;

wherein the molding apparatus comprises the molding apparatus of claim 1.

35. The process of claim 34, wherein the polymer composition comprises a filler.

36. The process of claim 35, wherein the filler is selected from the group consisting of glass fibers, glass flakes, glass beads, metal flakes, metal fibers, talc, mica, clay, and combinations comprising at least one of the foregoing fillers.

37. The process of claim 35, further comprising subjecting the polymer composition to vibrations effective to reorient the filler within the polymer composition.

38. The process of claim 34 wherein introducing the thermoplastic polymer composition into the mold apparatus is by injection molding.

39. The process of claim 34 wherein introducing the thermosettable composition reactive injection molding.

40. The process of claim 34 wherein the process for molding a thermoplastic polymer is blow molding, thermoforming, or vacuum forming.

* * * * *